(12) United States Patent
Kumar et al.

(10) Patent No.: US 8,392,675 B1
(45) Date of Patent: Mar. 5, 2013

(54) SYSTEM AND METHOD FOR REDUCED-OVERHEAD SNAPSHOT CREATION

(75) Inventors: Harendra Kumar, Bangalore (IN); Supratim Deka, Sunnyvale, CA (US); Mrinal K. Bhattacharjee, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1193 days.

(21) Appl. No.: 12/113,155

(22) Filed: Apr. 30, 2008

(51) Int. Cl.
*G06F 12/00* (2006.01)
(52) U.S. Cl. .......... 711/161; 711/162; 707/649
(58) Field of Classification Search .......... 711/161, 711/162; 707/649
See application file for complete search history.

(56) References Cited

U.S. PATENT DOCUMENTS

| | | | | |
|---|---|---|---|---|
| 7,743,028 | B1 * | 6/2010 | Stringham et al. | 707/646 |
| 2007/0079089 | A1 * | 4/2007 | Ohran et al. | 711/162 |

\* cited by examiner

*Primary Examiner* — Matthew Bradley
(74) *Attorney, Agent, or Firm* — Perkins Coie LLP (57) ABSTRACT

Systems and methods for reduced-overhead creation of persistent, point-in-time images (PPIs) are disclosed. The summary map is updated as needed when a block is newly freed or allocated after the latest PPI is taken. Therefore, PPI maps of previously created PPIs do not need to be scanned after PPI creation, thereby eliminating high latency disk reads and memory consumption for scanning. When a PPI is created, the active map and the latest PPI map are identical since the active map depicts the current allocation status of the blocks in the active file system. The active map only diverges from the PPI map when a block is allocated or freed in the active file system. Therefore, the active map can be used to update the status of blocks in the summary map when the status of a block diverges from its status as indicated in the latest PPI map.

29 Claims, 6 Drawing Sheets

SYSTEM AND METHOD FOR REDUCED-OVERHEAD SNAPSHOT CREATION

TECHNICAL FIELD

This disclosure relates generally to network storage systems, and more particularly, to snapshot (or, persistent, point-in-time image (PPI)) creation with reduced overhead.

BACKGROUND

Certain network storage servers have the ability to create a read-only, persistent, point-in-time image (PPI) (sometimes called a "snapshot") of a data set, such as a volume or logical unit. This capability allows the exact state of the data set to be restored from the PPI in the event of a catastrophic failure of the storage system or data corruption. The ability to restore data from a PPI provides system administrators with a simple mechanism to revert the state of their data to a known previous point in time as captured by the PPI.

A storage server typically maintains various metadata structures in persistent storage (e.g., on disk) to indicate the current allocation status (i.e., allocated or free) of all blocks of storage in the system. These metadata structures are used to facilitate write allocation decisions. A "block" in this context is the smallest unit of data that the storage system can independently manage, which in at least one known network storage system is a 4 Kbyte chunk of data. These metadata structures can be in the form of one or more bitmaps, where each entry in such a bitmap corresponds to, and represents the allocation status of, a different block of storage. An "entry" in a bitmap can be a single bit or a group of bits in this context.

However, the need to repeatedly read and update these metadata structures on disk can create significant overhead and operational inefficiencies in a storage server. In at least one known storage server, a separate bitmap is maintained for the active file system and for each PPI that the storage system maintains. To facilitate explanation, the bitmap for the active file system is called the "active map" herein, while the bitmap of a PPI (snapshot) is called a "PPI map" herein. The active file system and PPIs may share a common pool of storage. In that case, each block of storage managed by the storage server is represented by a corresponding bit in the active map and in each PPI map. The collective state of each block in all PPIs is represented in yet another bitmap, called a "summary map", which along with the active map is used to make write allocation decisions. The status of any particular block indicated in the summary map may be a simple logical OR of the corresponding bits in each PPI map. Consequently, when determining the allocation status of blocks, such as when preparing to execute a write operation, the storage server determines the status of any particular block from the indicated status of that block in the summary map and the active map.

In one known system, the summary map is updated immediately after a PPI is generated. For example, after a PPI is generated a scan of the on-disk PPI map for that PPI is performed to update block allocation status in the summary map. However, this scan is time consuming and resource intensive, at least partly because it involves numerous disk reads, which involve significant latency.

Further, a bit array is sometimes used to keep track of the map scan progress by assigning one bit for each bitmap block. The memory consumed by this bit array is overhead, which can be significant in size if the system maintains a large number of volumes and supports thin provisioning. This overhead can reduce the overall operational efficiency of the storage system. In addition, the map scan process is performed each time a block is to be freed resulting in additional disk reads during block frees. The performance penalty of PPI creation, therefore, can be substantial.

DETAILED DESCRIPTION

Described below are systems and methods for reduced-overhead PPI creation. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In accordance with the technique introduced here, instead of performing a PPI map scan after a PPI has been created, the summary map is updated "inline", i.e., only as needed ("on demand") when a block is newly freed or allocated after the latest PPI. Therefore, PPI maps of previously created PPIs do not need to be scanned after PPI creation, thereby eliminating the need for many high latency disk reads and the consumption of memory to maintain scan status. The technique introduced here is based on recognition of the fact that when a PPI is created, the active map and the latest PPI map are identical, since the active map depicts the current allocation status of the blocks in the active file system. The active map only diverges from the PPI map when a block is allocated or freed in the active file system. Therefore, in one embodiment of the present disclosure, the active map can be used to update the status of one or more blocks in the summary map only when the status of a block diverges (or is about to diverge) from its status as indicated in the latest PPI map.

The summary map can be updated based on a PPI map scan of the latest PPI only. However, in that case, whenever a block is freed in the active file system, a disk read has to be issued for the corresponding PPI map block so that the summary map can be updated, such that PPI creation is not a zero overhead operation.

The technique introduced here significantly decreases overhead associated with PPI creation, since the active map and summary map blocks normally are already present in short-term memory, and the summary map can be updated based on the active map without additional scans (e.g., background scans) of the PPI map whenever a PPI is generated, thereby eliminating many high latency disk reads.

The summary map only reflects the PPI map blocks that are different from the active map blocks. However, for purposes of write allocation, the active map and summary map in combination still provide the correct status of each block.

In one embodiment, divergence of an active map block from the latest PPI map is detected by maintaining and checking a consistency point count (CP count) for each block in the active map and for each PPI. A "consistency point" is the event at which new or updated data stored in temporary memory is committed to persistent storage (e.g., disks). For every consistency point occurrence, a global CP count is incremented. For the blocks of the active map which are committed to disk during a consistency point event, the particular CP counts associated with the blocks are stored in the respective block headers. Thus, the CP count of a block indicates the consistency point during which the block was last written to disk. In the case of a PPI, there is a PPI CP count which indicates the consistency point in which the PPI was generated. Also each PPI map block header has an independent CP count just like the active map.

In one embodiment, this header field can be used to determine whether the active map block has changed since the most recent PPI was created. Before an active map block is "dirtied" (i.e., modified in temporary memory), the CP count in its block header is compared with the CP count of the most recent PPI.

If the active map block's CP count is less than or equal to the latest PPI's CP count, then the block has not changed since the PPI was taken, hence the same block can be used as a PPI map block to update the summary map. If the active map block's CP count is greater than the latest PPI's CP count, then that block has already diverged from the PPI map block, hence the summary map need not be updated for that block. The summary map would have been updated when the active map block had diverged from the PPI map block.

Note that the term "file system" is only used herein to facilitate explanation to mean a structured system of data, and does not imply that the data must be stored in the form of files per se. That is, the data in a "file system", also referred to as the "data management module" can be stored in the form of raw blocks or groups of blocks or any other form of logical data container(s), and need not be stored in the form of files.

Figure 1:
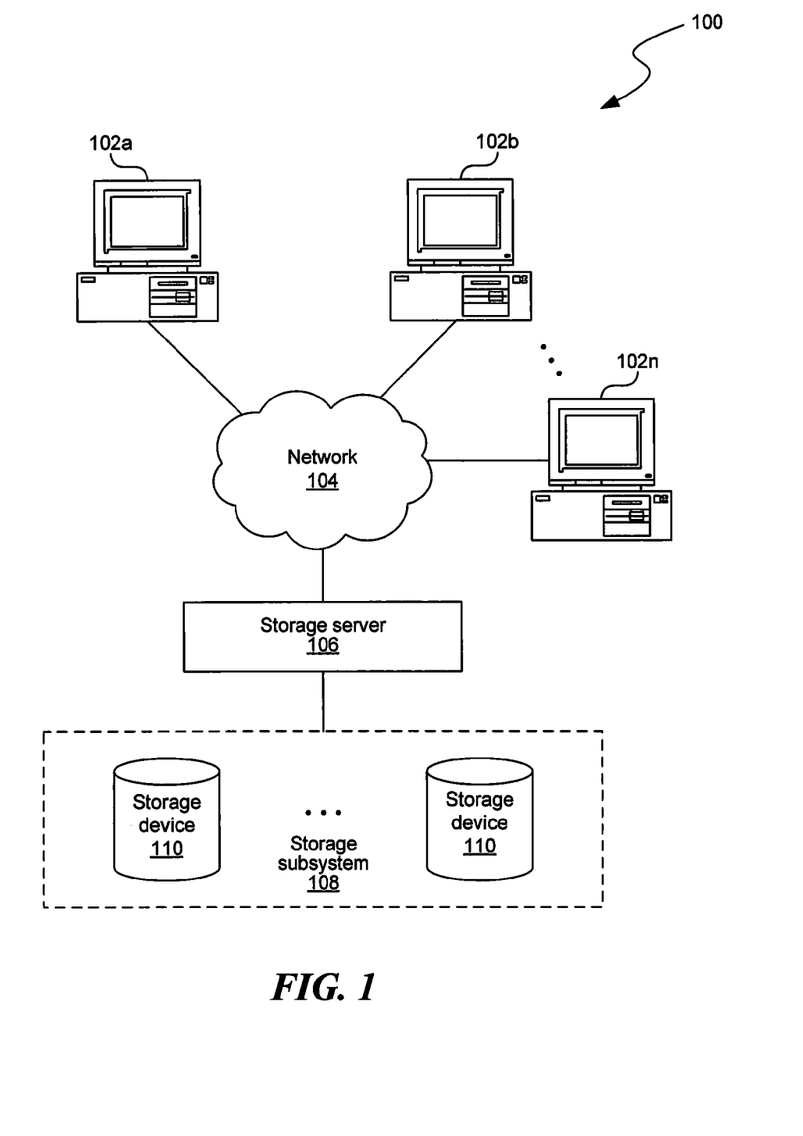
FIG. 1 illustrates an environment where a plurality of client devices communicates with a storage server to access a storage sub-system via a network, according to one embodiment.

FIG. 1 illustrates a storage network environment in which a plurality of client devices 102A-N communicate with a storage server 106 to access a storage sub-system 108 via a network 104, according to one embodiment.

The client devices 102A-N can be any system and/or device, and/or any combination of devices/systems that is able to establish a wired or wireless connection with another device, servers and/or other systems in some instances via a network (e.g., network 104). For example, the client devices 102A-N can be, but are not limited to, a processing unit, a server class computer, a personal computer, a computer cluster, a mobile computing device such as a notebook computer, a laptop computer, and/or a handheld computer (e.g., PDA), etc.

The network 104, over which the client devices 102A-N communicates, may be a telephonic network, an open network, such as the Internet, or a private network, such as an intranet and/or the extranet. The client devices 102A-N can be coupled to the network (e.g., Internet) via a dial up connection, a digital subscriber loop (DSL), cable modem, and/or other types of connections.

Communications can be achieved via one or more wired and/or wireless networks, such as, but is not limited to, one or more of, or any combination of, a Local Area Network (LAN), Wireless Local Area Network (WLAN), a Personal area network (PAN), a Campus area network (CAN), a Metropolitan area network (MAN), a Wide area network (WAN), and/or a Wireless wide area network (WWAN).

The network environment illustrated in the example of FIG. 1 may be used in any desired environment and incorporate additional or alternate features. The various embodiments described herein are not limited to any particular networking environment, and may be implemented in various storage processes. In the example of FIG. 1, the system 100 includes a storage server 106. The storage server 106 is coupled with a storage sub-system 108, which can include a plurality of storage devices 110. The storage server 106 is, in some embodiments, further coupled to client devices 102A-N, for example, via the network 104.

The storage sub-system 108, according to embodiments of the present disclosure, is managed, operated, controlled, and/or otherwise utilized by the storage server 106. For example, the storage server 106 may receive and respond to various read and write requests from the client devices 102A-N, directed to data stored in or to be stored in the storage sub-system 108 and/or the storage devices 110. The storage devices 110 in the storage subsystem 108 may be, for example, hard disk drives such as magnetic disks (e.g., SATA drives, eSATA drives, SAS drives, SCSI drives, etc.), solid-state drives, hybrid drives, optical disks such as compact disks-read only memory (CD-ROM) or digital versatile/video disks (DVD)-based storage, magneto-optical (MO) storage, tape-based storage, blue-ray storage, or any other type of non-volatile storage devices suitable for storing data.

The storage server 106 may have a distributed or partially distributed architecture; for example, it may include separate N-module (network module) and D-module (data module) components (not illustrated in the example of FIG. 1). In such an embodiment, the N-module is used to communicate with the client devices 102A-N, while the D-module includes the file system functionality and is used to communicate with the storage sub-system 108. In another embodiment, the storage server 106 may have an integrated architecture, where the network and data components are in a single physical platform. The storage server 106 further may be coupled through a switching fabric to other similar storage systems (not shown) that have their own local storage subsystems. In this way, all of the storage subsystems can form a single storage pool, to which any client of any of the storage systems has access. The storage server 106 can provide block-level data access service, file-level data access service, or both.

Figure 2:
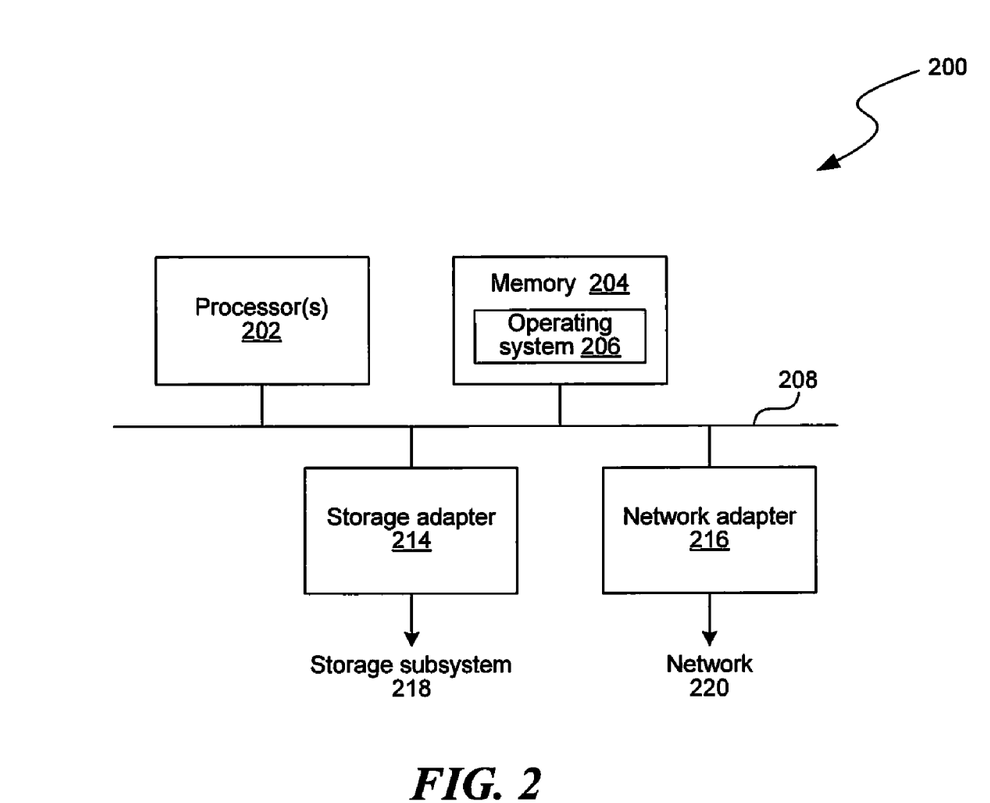
FIG. 2 illustrates an example block diagram of a storage server, according to one embodiment.

FIG. 2 illustrates an example block diagram of a storage server 200, according to one embodiment.

The storage server 200 may represent the storage server 106 of FIG. 1 The storage server 200 includes one or more processors 202 and memory module 204 coupled to an interconnect (or, bus) 208. The interconnect 208 can be any representation of any one or more separate physical buses, point-to-point connections, or both connected by any combination of appropriate bridges, adapters, and/or controllers suitable for the application.

The interconnect 208, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, otherwise referred to as "Firewire".

The processor(s) 202 may include one or more processing units of the storage server 200, operating in serial and/or in parallel to control, maintain, and/or monitor the operations of the storage server 200. In certain embodiments, the processor(s) 202 accomplish this by executing software or firmware stored in memory unit 204. The processor(s) 202 may be, or may include, a processor of any known and/or convenient configurations including but not limited to, one or more programmable general-purpose or special-purpose microprocessors, digital signal processors (DSPs), programmable controllers, application specific integrated circuits (ASICs), programmable logic devices (PLDs), or the like, or any combination of such devices.

The memory 204 is or can include the main memory component of the storage server 200. The memory 204 represents any form of random access memory (RAM), read-only memory (ROM), flash memory, or the like, or a combination of such devices. In operation, the memory 204 can store, the operating system 206 of the storage server 200.

Also connected to the processor(s) 202 through the interconnect 208 include by way of example but not limitation, a storage adapter 214 and/or a network adapter 216. The storage adapter 214 allows the storage server 200 to access a storage sub-system 218 and may be, for example, but is not limited to, a Fibre Channel adapter, an iSCSI adaptor, a SATA adaptor, an eSATA adaptor, and/or a SCSI adapter. The network adapter 216 (e.g., network controller) generally provides the storage server 200 with the ability to communicate wired or wirelessly with remote devices, such as client devices, over a network 220 and may be, for example, an Ethernet adaptor, a wireless network interface card, a router, an access point, a wireless router, a switch, a multilayer switch, a protocol converter, a gateway, a bridge, bridge router, a hub, a digital media receiver, and/or a repeater.

Figure 3:
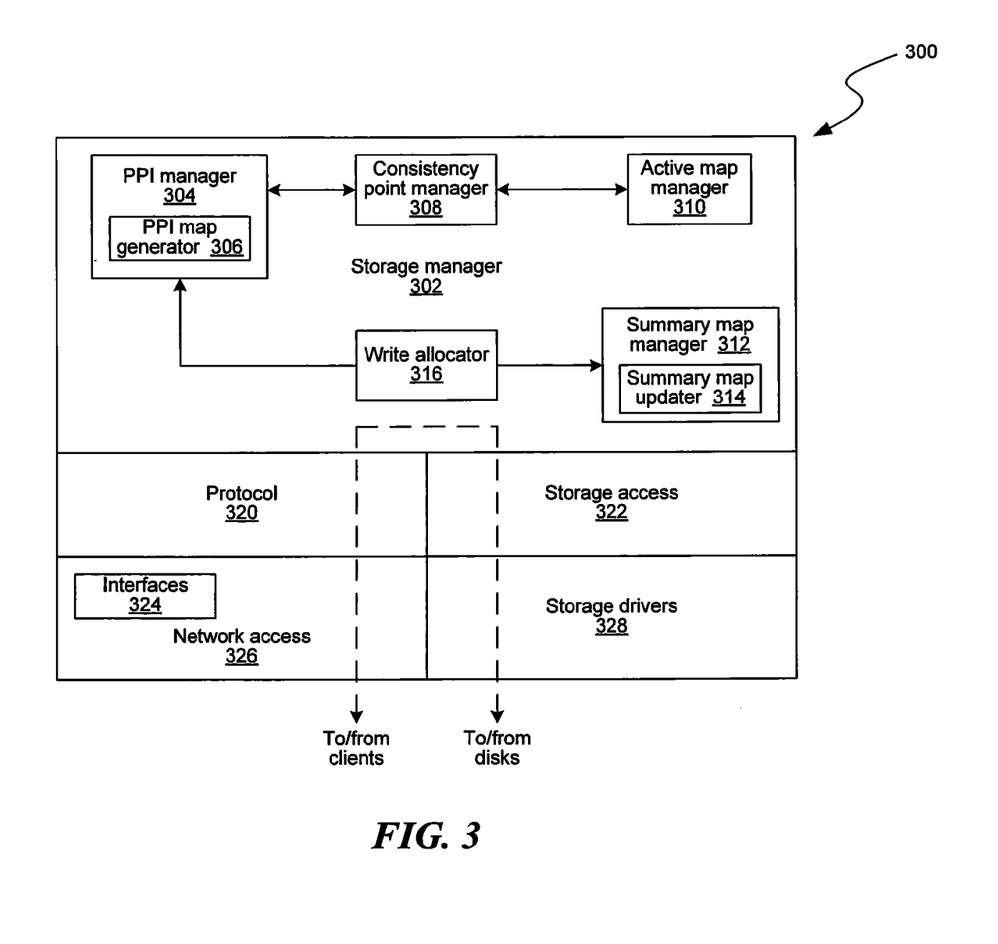
FIG. 3 depicts a block diagram of example components of an operating system of the storage server, according to one embodiment.

FIG. 3 depicts a block diagram of example components of an operating system 300 of the storage server, according to one embodiment.

The operating system 300 is generally similar to that of an operating system installed in the storage server 200 of the example of FIG. 2.

As shown, the operating system 300 includes several modules, or "layers." These layers include a storage manager 302. The file system manager 302 generally includes software agents that keep track of the directory structure (hierarchy) of the data stored in the storage sub-system and manages read/write operations performed on the data (e.g., executes read/write operations on the disks in response to client requests).

The operating system 300 also includes a protocol layer 320 and an associated network access layer 326, to allow a storage server to communicate over a network to other systems, such as client devices. The protocol layer 320 implements various higher-level network protocols, such as Network File System (NFS), Common Internet File System (CIFS), Hypertext Transfer Protocol (HTTP) and/or Transmission Control Protocol/Internet Protocol (TCP/IP). The network access layer 326 includes one or more drivers, which implement one or more lower-level protocols to communicate over the network, such as Ethernet. Interactions between client devices and storage devices (e.g., disks) are illustrated schematically as a path, which illustrates the flow of data through the operating system 300.

The operating system 300 further includes a storage access layer 322 and an associated storage driver 328 to allow a storage server to communicate with a storage subsystem. The storage access layer 322 implements a higher-level disk storage protocol, such as RAID, while the storage driver 328 implements a lower-level storage device access protocol, such as Fibre Channel Protocol (FCP) or SCSI. In one embodiment, the storage access layer 322 may implement a RAID protocol, such as RAID-4 or RAID-DP™ (RAID double parity for data protection provided by NetApp, Inc.), and therefore may alternatively be referred to as RAID layer 322.

In one embodiment, the storage manager 302 further includes a PPI manager 304 having a PPI map generator 306, a consistency point manager 308, an active map manager 310, and a summary map manager 312 having a summary map updater 314. Additional modules and/or software agents may be included without deviating from the technique introduced here.

The PPI manager 304 is any combination of software agents and/or hardware modules able to generate PPIs of a data set, for example, a data set in an active file system (or, "data management module"). For example, the PPI manager 304 is able to create PPIs of an active file system having a set of blocks. PPIs are generally copies of the file system that can be used to protect against accidental deletions or modifications of files without duplicating file contents. A diagrammatic representation of a PPI is illustrated with further reference to FIG. 4, discussed below. An example of the techniques involved in creating a PPI of a data set such as a file system are described in U.S. Pat. No. 5,819,292, which is herein incorporated by reference.

When a PPI is created in accordance with the technique introduced here, a PPI map, of the newly created PPI is generated. A PPI map is a version of the status of the set of blocks in the active file system at the time the PPI is created. In one embodiment, the PPI map generator 306 creates the PPI map when a PPI is created.

One embodiment of the system introduced here includes a consistency point manager 308. A consistency point is an event by which new or modified data that has been temporarily cached in a memory (e.g., RAM of a storage server) is committed to persistent storage (e.g., disk). Consistency points can occur at a fixed time interval, designated times, or in response to specified events, such as when the cache memory reaches a certain capacity level. In one embodiment, the consistency point manager 308 (CP manager) triggers a CP when appropriate and adjusts (e.g., increments) the global consistency point of the system. Each active map block that is written in this particular CP event also has the current CP count as part of the block header for each block. A diagrammatic representation of a consistency point count (CP count) and an active map is illustrated with further reference to FIG. 4. An active map is a data structure that represents the status of each block in the active file system (e.g., whether the block is free or allocated). In one embodiment, the active map, and each PPI map has one bit per block number that indicates if a particular block is in use in the active system or in the corresponding PPI, respectively.

In addition, a consistency-point count (CP count) is stored in a header of an active map block. The consistency-point count in the block header of an active map block corresponds to the global CP count of system during which that active map block was last committed to disk from memory. The active map is a file (metafile) in the file system comprised of blocks. Each block is 4 Kbytes in size and each block has a 16 byte block header. In general, 4 bytes of the header can be used to store the CP count of the CP event during which that block was last committed to disk.

The CP manager 308 is operatively coupled to the PPI manager 304 such that, for example, when the PPI manager 304 indicates to the CP manager 308 that a PPI has been created, the CP manager 308 increments the CP count (e.g., increased the CP count by 1) of the PPI and stores the updated value. In general, a PPI is can be created during a consistency-point event occurrence. Therefore, a system CP count can be associated with the PPI that was created during the CP event.

In one embodiment, the CP manager 308 is further able to identify the CP count of one or more active map blocks. In one embodiment, this is performed by the CP manager 308 retrieving the CP count from the header of one or more active map blocks. The CP count can, in one embodiment, be used to detect whether the active map block has changed since the most recent PPI was taken.

One embodiment of the system introduced here includes an active map manager 310. The active map manager 310 is any combination of software agents and/or hardware modules able to track, update, monitor, and/or store the status of one or more blocks in an active file system. For example, the active map manager 310 may update a bit value in the block number to indicate usage of a particular block in the active file system. The active map manager 310 can further communicate with the CP manager 308 such that the CP manager 308 can identify the bit status of one or more blocks, for example, from the header of the active map block. In general, an active map block has a 16 byte header and the remaining 4080 bytes can be used to store the allocation status (e.g., free or allocated) of blocks in the storage manager 302.

Before an active map block is dirtied (i.e., before the block is modified in temporary memory) the CP count of the particular block can be compared to the CP count of the most recent PPI. If the active map block's CP count is less than or equal to the latest PPI's CP count, then the block has not changed since the PPI was taken, hence the same block can be used as a PPI map block to update the summary map. If the active map block's CP count is greater than the latest PPI's CP count, then that block has already diverged from the PPI map block, hence the summary map need not be updated for that block. CP count determination is illustrated with further reference to the example of FIG. 4. The summary map would have been updated when the active map block had diverged from the PPI map block.

One embodiment of the system introduced here includes a summary map manager 312. The summary map manager 312 can be any combination of software agents and/or hardware modules that are able to generate, create, and/or update a summary map. A summary map represents the status of each block over a period of time by combining data (such as, for example, by applying a logical OR operation) from each PPI map. A diagrammatic representation of a summary map is illustrated with further reference to FIG. 4. For example, the summary map manager 312 may communicate with the PPI manager 304 to obtain PPI maps that are created when a PPI is taken.

In one embodiment, the summary map manager 312 generates a summary map by performing a logical OR operation on the maps for PPIs created at various points in time. The summary map manager 312, in one embodiment, updates summary maps corresponding to the blocks covered by an active map block if the active map block is diverging from the PPI map (so that those blocks stay "protected"). If a block has not diverged as reflected by the CP count of the active map being less than or equal to the CP count of the most recent PPI, same block can be used as a PPI map block to update the summary map.

Until the active map diverges from the latest PPI map the summary map does not need to be updated because the write allocator 316 cannot reuse the blocks covered by the active map since they are in use in the file system. The write allocator 316 determines the block status to identify available blocks that can be used in a write process.

If the active map block diverges (e.g., when the allocation status of one or more bits in the block has changed) from the PPI map, then the corresponding blocks (whose allocation status have changed) in the PPI map become unprotected (e.g., they may not be marked in use in either the active map or in the summary map). Therefore the write allocator 316 might erroneously reuse those blocks. Therefore, the summary map should be updated to ensure the allocation status of the blocks that have changed is accurately reflected. In one embodiment, the summary map updates are performed by the summary map updater 314.

Figure 4:
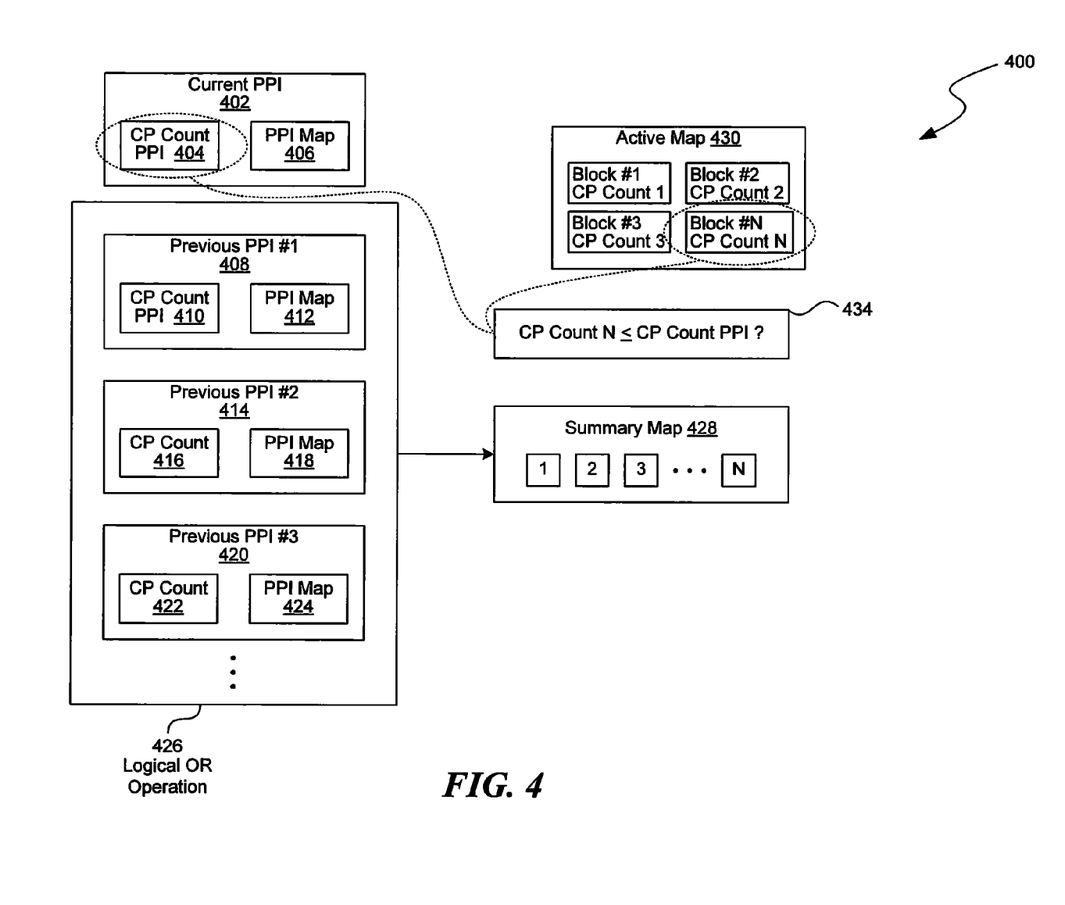
FIG. 4 depicts a diagrammatic representation of a summary map, an active map, and maps corresponding to PPIs, according to one embodiment.

FIG. 4 depicts a diagrammatic representation 400 of a summary map 428, an active map 430, and maps 408, 414, and 420 corresponding to PPIs as described in conjunction with FIG. 3, according to one embodiment. The current PPI 402 includes a PPI CP count 404 and a PPI map 406 which is representative of a status of a plurality of blocks of the active file system at the time of the current PPI 402 generation. The current PPI 402 is also associated with a plurality of PPIs generated preceding the current PPI 402. The plurality of PPIs shown in this example includes Previous PPI #1 408, Previous PPI #2 414, Previous PPI #3 420 . . . etc. Each of the plurality of preceding PPIs is generated preceding the current PPI 402 in time and also includes a CP count and a PPI map.

The summary map 428, for example, can be generated from the plurality of PPI maps (e.g., PPI map 412, PPI map 418, PPI map 424, etc.), each PPI map associated with a Previous PPI of the plurality of preceding PPIs. The summary map 428 can, for example, be used to determine an allocation status of one or more blocks of the set of blocks as being allocated or free. In one embodiment, the summary map 428 is generated from a logical-OR operation among the plurality of PPI maps.

The blocks 1, 2, 3 . . . N in the active map 430 form a bitmap that indicates the allocation status of each block in the active file system. In accordance with one embodiment, the PPI CP count 404 is compared with one or more of the CP counts of the blocks 1-N to determine if the active map block has diverged from the map 406. For example, if the CP count N is less than or equal to 434 the PPI CP count, then the active map 430 has not diverged from the map 406. Such an active map block can be used as a PPI map block to update the summary map 428.

In contrast, if the active map 430 has diverged from the map 406, the summary map 428 need not be updated for that block as the summary map 428 would have been updated when the active map block 430 diverged from the PPI map block.

Figure 5:
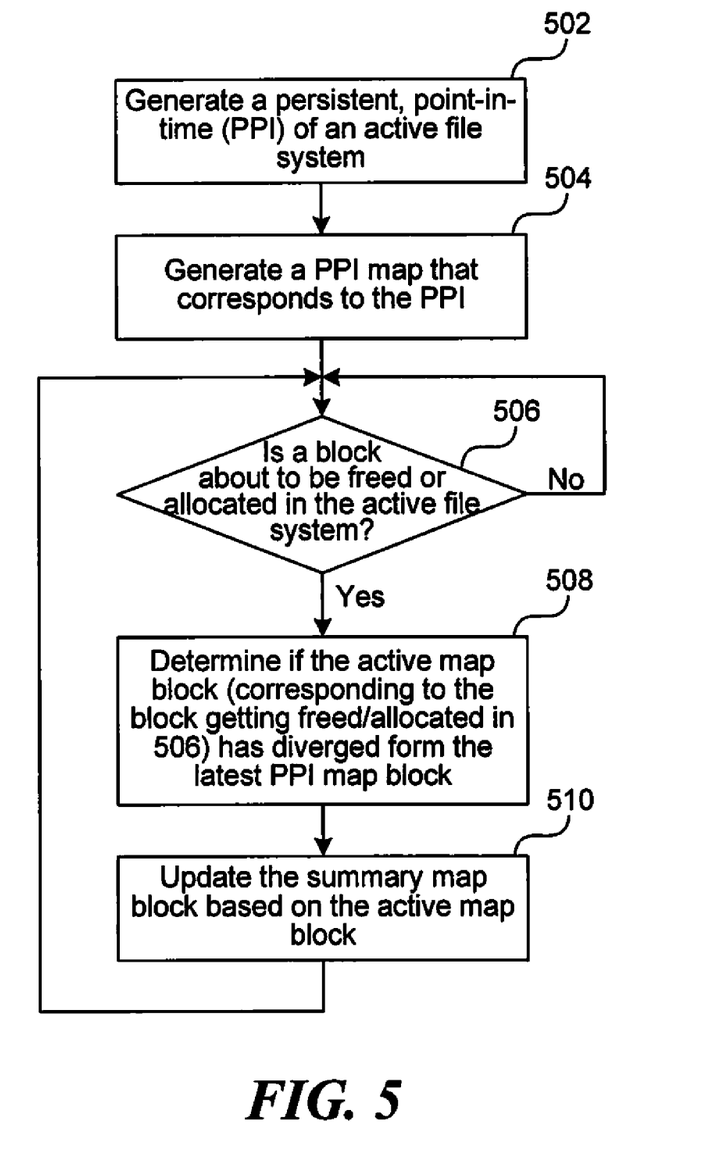
FIG. 5 depicts an example flow diagram of a process for updating the summary map, according to one embodiment.

FIG. 5 depicts an example of a process for updating the summary map, according to one embodiment.

In sub-process 502, a PPI of an active file system is generated. For example, the PPI may be generated by the PPI manager 304 in the example of FIG. 3. In sub-process 504, a PPI map that corresponds to the current PPI is generated. The PPI map may be generated by the PPI map generator 306. In sub-process 506, it is determined whether any block in the active file system is about to be freed or allocated (sub-process 506). The determination process is illustrated with further reference to FIG. 6. If any block in the active file system is about to be freed or allocated (sub-process 506), as can be indicated by a consistency point count check further described with reference to FIG. 6, the corresponding bit in the block of active map file will need to be updated. In this situation, in sub-process 508, the active map block(s) that is/are about to diverge from the PPI map are identified thus eliminating the overhead of reading or scanning the PPI map blocks for updating the summary map. Diverging blocks may be identified by the storage manager 302 or any other sub-components thereof (e.g., active map manager 310) in the manner described above. A process of detecting divergent blocks in described below in greater detail in reference to FIG. 6.

In sub-process 510, the status of the active map block which is about to diverge is updated in the summary map. For example, the update may be performed by the summary map manager 312. In one embodiment, the update is performed by the summary map updater 314 in the summary map manager 312. In sub-process 512 (e.g., if no block is about to be freed or allocated), the status of the set of blocks in the summary map is maintained. After subprocess 510 or 512, the process leaps back to decision subprocess 506.

Figure 6:
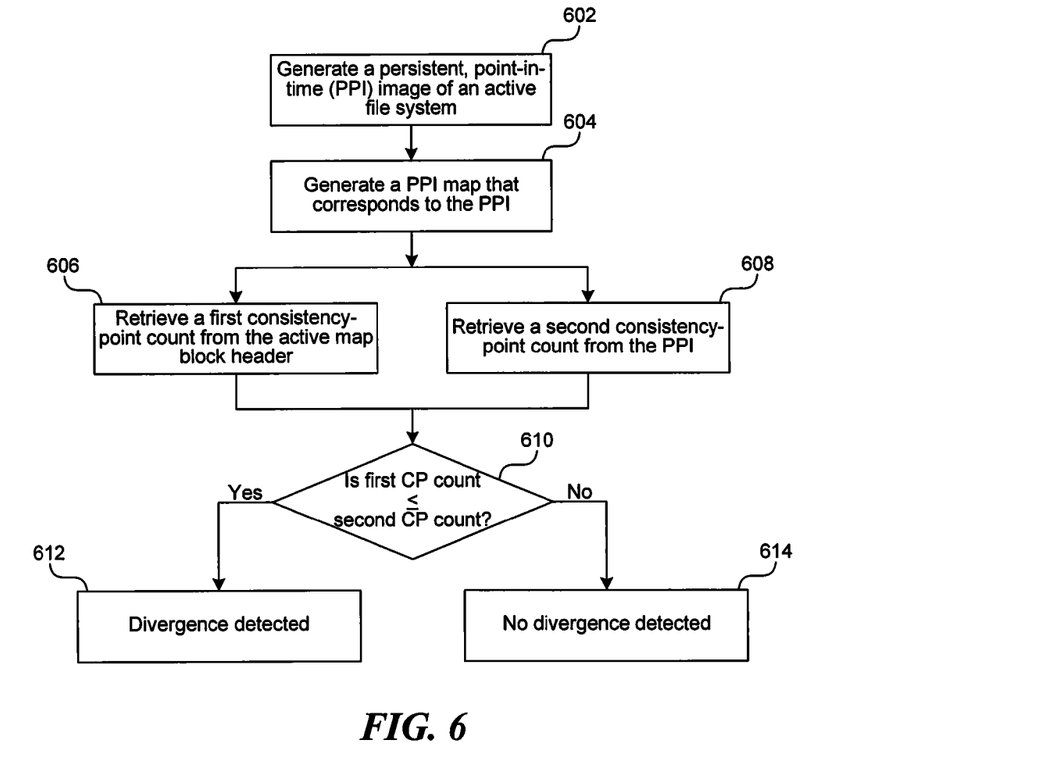
FIG. 6 depicts an example flow diagram of a process for detecting the presence of divergence of an active map from a PPI map, according to one embodiment.

FIG. 6 depicts an example of sub-process 506 for detecting divergence of the active map from the summary map, according to one embodiment.

In sub-process 606, the current CP count is retrieved from the active map block header ("first CP count"), such as the active map block header of FIG. 4. In sub-process 608, the CP count is retrieved from the most recent PPI ("second CP count"). The first and second CP counts may be retrieved by the consistency point manager 308. In sub-process 610, the first CP count is compared with the second CP count, for example, by the consistency point manager 308. If the first CP count is found to be less than or equal to the second CP count in sub-process 610, then in sub-process 612 divergence has been detected, hence the same block can be used as a PPI map block to update the summary map. By updating the summary map in this manner, there is no need to load the PPI map blocks by recognizing that the active map block is also a PPI map block until divergence. Therefore, the summary amp is updated only when the active map diverges from the latest PPI map. No additional disk read is performed for the summary update.

On the other hand, if the first CP count is greater than the second CP count, then no divergence is considered to be detected in sub-process 614 and the summary map need not be updated for that block since the active map is not currently diverging from the PPI map, the summary map has previously been updated when the divergence was detected, thus no action is required in this situation.

The technique introduced here significantly decreases overhead associated with PPI creation, since the active map and summary map blocks normally are already present in short-term memory, and the summary map can be updated based on the active map without additional scans (e.g., background scans) of the PPI map whenever a PPI is generated, thereby eliminating many high latency disk reads. Furthermore, the buffer cache is not polluted by loading PPI maps blocks during scans.

What is claimed is:

1. A method, comprising:
    generating a current persistent, point-in-time image (PPI) of a data management module corresponding to a set of blocks, the data management module being associated with an active map, wherein the active map is representative of a current allocation status of the set of blocks;
    generating a PPI map that corresponds to the current PPI, wherein the PPI map is representative of allocation status of the set of blocks at a time at which the current PPI was generated;
    detecting, for a particular block of the set of blocks, divergence in allocation status between the active map and the PPI map; and
    in response to detecting the divergence for the particular block, updating allocation status of the particular block in a summary map, the summary map indicative of allocation status of each block of the set of blocks based on a plurality of PPI maps, wherein the plurality of PPI maps correspond to PPIs generated at different points in time, and wherein the summary map and the active map are used to determine an allocation status of one or more blocks of the set of blocks as being allocated or free when making a write allocation decision.

2. The method of claim 1, further comprising, in response to detecting a lack of divergence, not updating any allocation status of the particular block in the summary map.

3. The method of claim 1, wherein, the detecting the divergence comprises, identifying a first consistency-point count corresponding to a particular block associated with the active map.

4. The method of claim 3, wherein, the detecting the divergence comprises, identifying a second consistency-point count corresponding to the PPI map.

5. The method of claim 4, further comprising, comparing the first consistency-point count with the second consistency-point count.

6. The method of claim 5, further comprising, in response to detecting that the first consistency-point count is greater than the second consistency-point count, not updating the allocation status of the particular block in the summary map.

7. The method of claim 6, further comprising, in response to detecting that the first consistency-point count is less than or equal to the second consistency-point count, updating the allocation status of the particular block in the summary map using the corresponding allocation status of the particular block in the active map.

8. The method of claim 6, wherein the first consistency-point count is stored in a block header of the particular block that is associated with the active map.

9. The method of claim 1, further comprising, creating a plurality of PPI maps, wherein each PPI map corresponds to a PPI of the plurality of PPIs generated; wherein, the summary map is generated from a logical-OR operation among the plurality of maps.

10. A non-transitory machine-readable medium having stored thereon data representing sets of instructions which, when executed by a machine, cause the machine to perform operations, comprising:
    generating a current persistent, point-in-time image (PPI) of a data management module corresponding to a set of blocks, the data management module corresponding to an active map, wherein the active map is representative of a current allocation status of the set of blocks;
    generating a PPI map that corresponds to the current PPI, wherein the PPI map is representative of a allocation status of a plurality of blocks of the data management module at a time at which the current PPI was generated;
    retrieving a first consistency-point count corresponding to a particular block associated with the active map, wherein the first consistency-point count is stored in a block header of the particular block;
    retrieving a second consistency-point count corresponding to the most recent PPI; and
    based on a detected relationship between the first consistency point count and the second consistency point count, updating allocation status of the particular a block in a summary map, the summary map representing a logical combination of the at least said PPI map.

11. The operations of claim 10, further comprising, detecting divergence of the active map from the PPI map by comparing the first consistency-point count and the second consistency-point count.

12. The operations of claim 11, further comprising, in response to detecting a lack of divergence, maintaining the allocation status of the set of blocks in a summary map, the summary map indicating allocation status of a plurality of PPIs generated preceding the current PPI in time, wherein the summary map in conjunction with the active map is used to determine allocation status of one or more blocks of the set of blocks as being allocated or free.

13. The operations of claim 11, further comprising, in response to detecting that the first consistency-point count is greater than the second consistency-point count, not updating the allocation status of the block in the summary map.

14. The operations of claim 13, further comprising, in response to detecting that the first consistency-point count is less than or equal to the second consistency-point count, updating the allocation status of the particular block in the summary map using the corresponding allocation status of the particular block in the active map.

15. The storage server of claim 13, further comprising, generating a plurality of maps, wherein each map corresponds to a PPI of the plurality of PPIs generated preceding the current PPI; wherein, the summary map is generated from a logical-OR operation among the plurality of maps.

16. A storage server, comprising:
a processor to control storage operation that enables a remote client to access data stored in a storage subsystem;
a network interface through which to communicate with the remote client;
a storage interface through which to access the storage subsystem; and
a memory storing instructions which, when executed by the processor, cause the storage server to perform operations comprising:
generating a current persistent, point-in-time image (PPI) of a data management module corresponding to a set of blocks, the data management module being associated with an active map, wherein the active map is representative of a current allocation status of the set of blocks;
generating a PPI map that corresponds to the current PPI, wherein the PPI map is representative of a allocation status of the set of blocks at a time at which the current PPI was generated;
detecting divergence in allocation status between the active map and the PPI map; and
in response to detecting the divergence, identifying one or more blocks of the set of blocks that has diverged in the active map from the PPI map and updating allocation status of one or more identified blocks in a summary map, wherein the summary map represents a logical combination of the active map and at least said PPI map.

17. The storage server of claim 16, wherein the operations further comprises, in response to detecting a lack of divergence, not updating allocation status of any block in the summary map.

18. The storage server of claim 17, wherein, the detecting the divergence comprises, identifying a first consistency-point count corresponding to a particular block associated with the active map.

19. The storage server of claim 18, wherein, the detecting the divergence comprises, identifying a second consistency-point count corresponding to the PPI map.

20. The storage server of claim 19, wherein the first consistency-point count is stored in a block header corresponding to a particular block that is associated with the active map.

21. The storage server of claim 20, further comprising, comparing the first consistency-point count with the second consistency-point count.

22. The storage server of claim 21, further comprising, in response to detecting that the first consistency-point count is less than or equal to the second consistency-point count, updating the allocation status of the particular block in the summary map.

23. The method of claim 22, further comprising generating a PPI map that indicates an allocation status, for the PPI, of each of the plurality of blocks, wherein said updating is performed without having to read the PPI map.

24. The method of claim 22, further comprising detecting said divergence by comparing a consistency point count of the particular block associated with the active map with a consistency point count of the new PPI.

25. The method of claim 24, wherein the summary map is updated when the active map diverges from the new PPI without requiring additional disk reads.

26. The method of claim 25, wherein, a buffer cache is not used when updating the summary map since disk reads are not required.

27. The storage server of claim 19, further comprising, in response to detecting that the first consistency-point count is greater than the second consistency-point count, not updating allocation status of any block in the summary map.

28. A method, comprising:
generating a current persistent, point-in-time image (PPI) of a data management module corresponding to a set of blocks, the data management module being associated with an active map, wherein the active map is representative of a current allocation status of the set of blocks;
generating a PPI map that corresponds to the current PPI, wherein the PPI map is representative of allocation status of the set of blocks of the data management module at a time of generation of the current PPI;
identifying a first consistency-point count corresponding to a particular block associated with the active map and a second consistency-point count corresponding to the PPI map, wherein the first consistency-point count is stored in a block header corresponding to a particular block that is associated with the active map;
comparing the first consistency-point count with the second consistency-point count to detect divergence of an allocation status of the particular block between the active map and the PPI map;
in response to detecting the divergence for the particular block, updating the allocation status of the particular block in a summary map, the summary map indicative of allocation status of each of the set of blocks in a PPI generated before the current PPI, wherein the summary map in conjunction with active map is used to determine an allocation status of one or more blocks of the set of blocks as being allocated or free; and
in response to detecting a lack of said divergence, not updating the allocation status of any block in the summary map.

29. A method comprising:
maintaining an active map that indicates a current allocation status of each of a plurality of blocks in a data management module;

generating a summary map and a persistent, point-in-time images (PPI) of the data management module;
creating a new persistent, point-in-time image (PPI) of the data management module;
after the new PPI has been created, waiting to update the summary map as needed when a block has been allocated or freed in the data management module, and then updating the allocation status of the block in the summary map based on a consistency point check that detects when the block has been newly freed or allocated after creation of the new PPI such that the updated summary map is created without having to merge the new PPI with the summary map every time a particular block associated with the active map diverges from the PPI map during a block free operation; and
using the updated summary map in conjunction with the active map bleak to make a write allocation decision.

* * * * *